Figure 1:
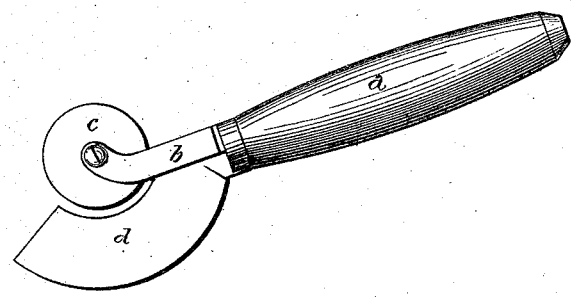

J. E. BRECHBIEL.
Cigar-Wrapper Knife.

No. 162,792.

Patented May 4, 1875.

WITNESSES.

INVENTOR.
John E. Brechbiel
per F Lehmann att.

UNITED STATES PATENT OFFICE.

JOHN E. BRECHBIEL, OF HIGHLAND FALLS, NEW YORK.

IMPROVEMENT IN CIGAR-WRAPPER KNIVES.

Specification forming part of Letters Patent No. 162,792, dated May 4, 1875; application filed April 14, 1875.

*To all whom it may concern:*

Be it known that I, JOHN E. BRECHBIEL, of Highland Falls, in the county of Orange and State of New York, have invented certain new and useful Improvements in Knives for Cutting Cigar-Wrappers; and I do hereby declare the following to be a full, clear, and exact description of the invention, such as will enable others skilled in the art to which it pertains to make and use it, reference being had to the accompanying drawings, which form a part of this specification.

My invention relates to an improvement in knives for cutting cigar-wrappers; and it consists in combining a circular cutting-blade for cutting cigar-wrappers from the tobacco-leaf with another blade for trimming the wrappers to form the tip, as will be more fully described hereafter.

The accompanying drawing represents my invention.

In the handle $a$ is secured the shank of the circular knife $c$, the upper end of which shank $b$ is bifurcated and curved outward, so that the knife $c$ may be secured at its center in the fork by either rivet or screw, and be allowed to turn freely. This circular blade is used for cutting cigar-wrappers out of the tobacco-leaf, and prevents the leaves from being torn and thereby rendered unfit for wrappers, which occurs especially when the tobacco is somewhat dry, and the fibers large and hard. When in this condition it requires a very sharp thin knife, and careful handling to cut wrappers, and ordinary knives have constantly to be sharpened to perform the work properly. The circular knife will cut the fibers without tearing the leaves, and requires no skill to use it.

From between the lower end of the fork $b$ projects the curved blade $d$, the cutting-edge of which is outward and convex, and its back turned toward the circular blade concave. The upper end of the blade $d$ is cut off squarely, leaving the point almost a right angle, which is the most favorable form for shaping wrappers.

The combination of the two cutting-blades enables the operator, with the same implement, to trim the tobacco-leaf for a cigar, whether it be to cut the wrapper from the leaf or to shape it for the tip, and has the advantage of not tearing the leaves. By combining these two knives together, upon the same end of the handle, they can be used with great readiness, without the trouble of having to reverse the ends of the handle, as heretofore.

Having thus described my invention, I claim—

The combination of the handle $a$, rolling-blade $c$, and drawing-blade $d$, the two blades being secured to the same end of the handle, substantially as shown and described.

In testimony that I claim the foregoing I have hereunto set my hand and seal this 31st day of March, 1875.

JOHN EDWARD BRECHBIEL. [L. S.]

Witnesses:
    WM. H. D. MEARNS,
    WM. HARRISON.